Nov. 9, 1948.  P. DUNSHEATH ET AL  2,453,418
BUOYANT ELECTRIC CABLE
Filed Nov. 30, 1940  2 Sheets-Sheet 1
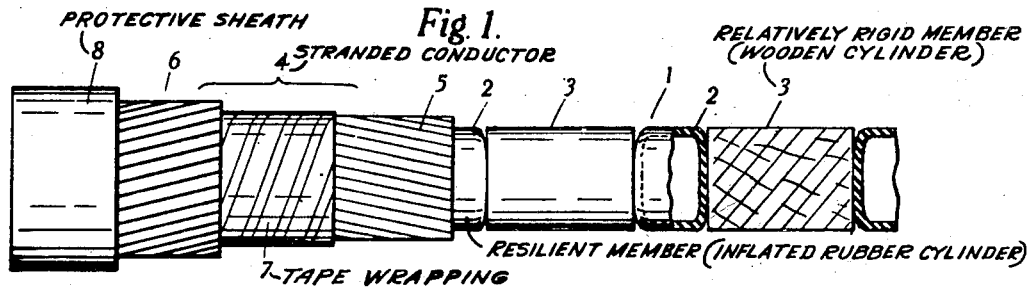
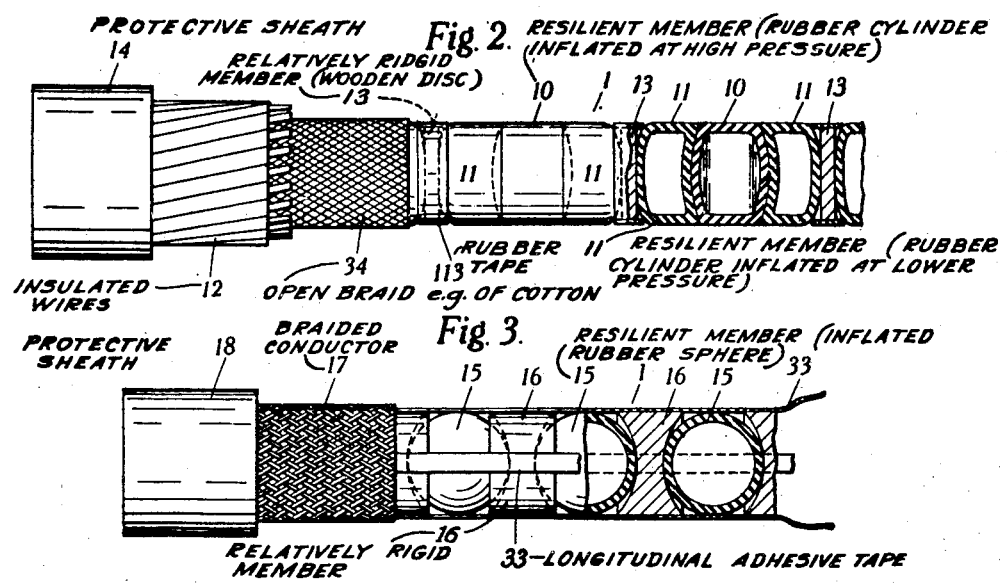
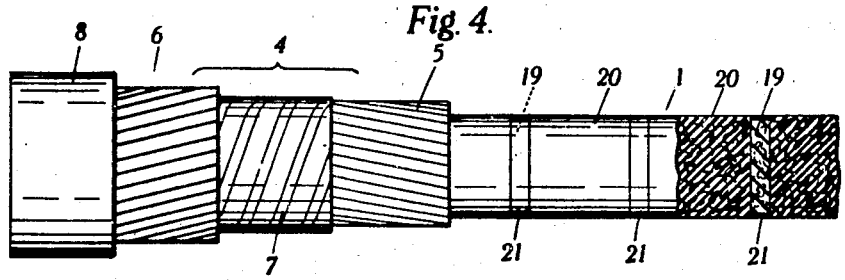
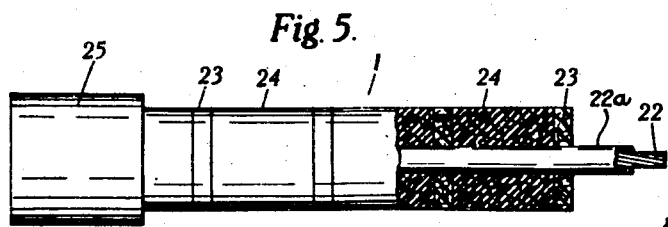

Nov. 9, 1948.                P. DUNSHEATH ET AL                    2,453,418
                              BUOYANT ELECTRIC CABLE
Filed Nov. 30, 1940                                              2 Sheets-Sheet 2
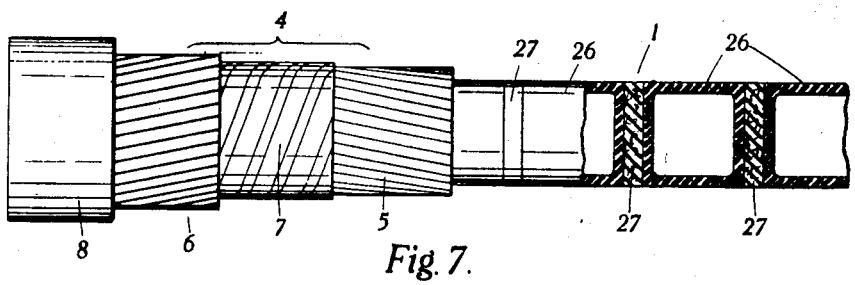
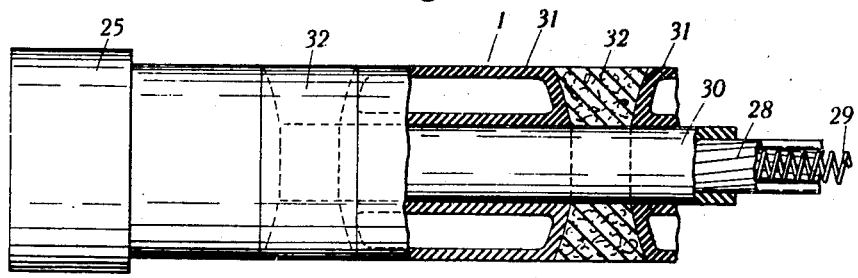
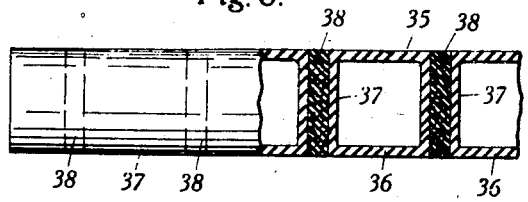
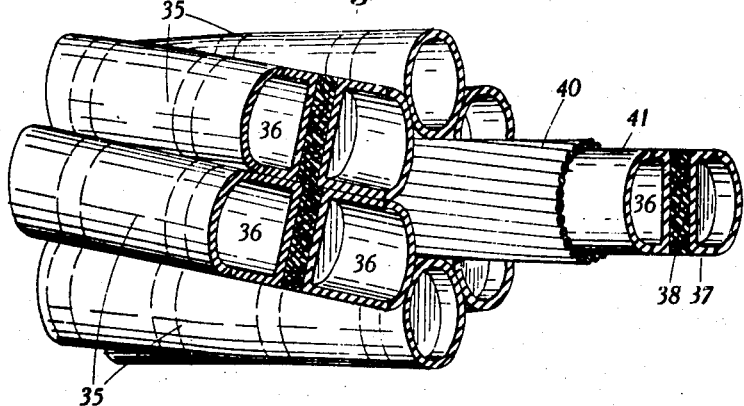

Patented Nov. 9, 1948

2,453,418

UNITED STATES PATENT OFFICE 2,453,418

BUOYANT ELECTRIC CABLE

Percy Dunsheath, Abinger, and William Cyril Barry, Gravesend, England, assignors to W. T. Henley's Telegraph Works Company Limited, Westcott, Dorking, Surrey, England Application November 30, 1940, Serial No. 367,924
In Great Britain January 4, 1940

25 Claims. (Cl. 174—101.5)

This invention is concerned with the production of an insulated electric cable which is capable of floating in water and of transmitting power currents. Cables of this kind may be required for instance, to carry currents of the order of several thousand amperes at low voltage in connection with the detection and destruction of magnetically actuated submarine mines and for the supply of power at higher voltages to floating mobile dredgers and for analagous purposes. For such purposes the cable must be rendered buoyant. It must also be flexible and must possess sufficient tensile strength to enable it to be trailed in considerable lengths without excessive deformation. It should offer as little friction as practicable and it should be capable of giving up easily to the medium in which it floats the heat generated therein by the passage of the heavy current through the cable. It is an object of this invention to provide a cable which satisfies these rather onerous requirements. According to our invention we provide an insulated electric power cable comprising a flexible core which is extensively sub-divided longitudinally of the cable into a plurality of closed hollow cells sufficing to render the cable buoyant in water, the cellular core comprising a series of resilient members with intercalations of relatively rigid members. The combination of resilient members with relatively rigid members results in a core which is sufficiently flexible yet possesses adequate resistance to radial compression exerted, for instance, at a paying-out capstan and, in the case where the conductor is stranded or braided around the circumference of the core, due to the tension in the conductor. Either the resilient members or the rigid members or both resilient and rigid members may be of cellular form and the size of the closed hollow cells may vary very considerably according to the material or materials used for the manufacture of the core.

The cellular core may comprise a series of inflated spheres or cylinders of flexible material with intercalations of cylinders of relatively rigid material which may or may not be of cellular form, or it may comprise a series of cylinders of resilient cellular material, for instance, soft expanded rubber, with intercalations of cylinders of relatively rigid cellular material, for instance, hard expanded rubber, cork or wood. The term "cylinder" is used herein in its broadest sense and where the context permits includes not only right circular cylinders but bodies having a surface approximating to the cylindrical, cylindrical or approximately cylindrical surfaced bodies with concave or convex ends and such short cylindrical or approximately cylindrical bodies as might properly be termed discs. Alternatively the cellular core may comprise a series of resilient members with intercalations of hollow metal drums or of drums of moulded material, for instance, phenol formaldehyde resin or hard rubber.

Generally the cellular core will consist of a single chain of resilient and relatively rigid members in cable in which the conductor is distributed around the circumference of the cellular core to facilitate the transfer of heat therefrom to the surrounding liquid. A single chain of elements may also be used in cable, such as a dredger cable, where the current is relatively small and the conductor may advantageously be located centrally within the core. In such a construction the elements of the chain will be of annular form and be threaded on the conductor, and may, if they are of insulating material, serve as a dielectric therefor. In some cases, however, the cellular core may be built up of a number of chains of resilient and relatively rigid members bunched or laid up helically together about the cable axis or disposed about a central conductor which may be a solid or hollow strand.

The invention will now be more fully described with the aid of the accompanying drawings which show, by way of example only, numerous constructions of cables with cellular cores built up of one or more series of resilient members with intercalations of relatively rigid members.

In the drawings

Figure 1 is an elevation, partly in section, of the stepped end of a buoyant heavy current cable, employed for the detection and destruction of magnetically actuated submarine mines, with a cellular core, consisting of a series of inflated bodies with intercalations of cylinders of relatively rigid material;

Figure 2 is a similar view of a buoyant heavy current cable with a modified form of the type of cellular core shown in Figure 1;

Figure 3 is a similar view of a buoyant heavy current cable with a further modified form of the type of core shown in Figure 1;

Figure 4 is an elevation, partly in section, of the stepped end of a buoyant heavy current cable with a cellular core consisting of a series of cylinders of resilient cellular material with intercalations of cylinders of relatively rigid cellular material;

Figure 5 is an elevation of the stepped end of a buoyant power cable with a conductor located within a cellular core of the type shown in Figure 4;

Figure 6 is an elevation partly in section of the stepped end of a buoyant heavy current cable with a cellular core consisting of a series of resilient members separated by rigid hollow drums;

Figure 7 is an elevation partly in section of the stepped end of a buoyant power cable with a central conductor located within a modified form of the type of core shown in Figure 6;

Figure 8 shows an elongated cavitied member suitable for use as a cellular core or as a component of a cellular core for a buoyant heavy current cable; and Figure 9 shows a buoyant power cable having a hollow conductor located within a group of cavitied members of the type shown in Figure 8.

In the form of construction shown in Figure 1 the cellular core 1 consists of a series of resilient members 2 with a relatively rigid member 3 interposed between each two successive resilient members. The resilient members 2 are inflated cylinders of rubber or rubber-like material and the relatively rigid members 3 are cylinders of wood of fairly low specific gravity, for instance, white pine. Such a construction has the advantage that both resilient and relatively rigid members are of cellular form and both in themselves buoyant. Instead of wooden cylinders, cylinders of hard cellular rubber or of cork may be used. The conductor 4 is disposed about the cellular core and consists of an inner layer 5 of wires stranded directly on the core and of an outer layer 6 of wires stranded in the opposite direction over a lapping 7 of tape applied to the first layer to prevent it "bird-caging" while the second layer is being applied. Over the tubular conductor so formed is a sheath 8 of tough rubber which serves both as insulation for the conductor and as a waterproof protective sheath for the cable. The construction of core 1 shown in Figure 1 is very resistant to radial compression and is, therefore, particularly suitable for the inboard end of a towed cable. It is not, however, so buoyant as the construction shown in Figure 2 in which the cellular core 1 is built up of groups of inflated members separated by relatively rigid short cylinders or discs 13 of wood. Each group of inflated members may comprise two or more cylinders of rubber or other suitable flexible, impervious material but preferably three inflated members are used, a central member 10 inflated at a high pressure sandwiched between two members 11 that are inflated at a lower pressure. With this arrangement the ends of the high pressure cylinder 10 embed themselves in the adjacent ends of the low pressure cylinders 11 with the result that the cylindrical surfaces of the three bodies are almost continuous, whereas if three cylinders inflated to the same pressure are used the cylinders do not make contact with one another save in the central parts thereof. The provision of the high pressure cylinder in the centre of the group naturally gives greater support to the conductor 4 in the region it is most needed, namely intermediate the relatively rigid members 13. Although these latter members are shown to be of wood, they may be of hard expanded rubber, cork, or other sufficiently rigid material. Their faces may be flat, as shown, or they may be dished the better to fit against the bulged ends of the inflated cylinders on either side of them. The conductor carried by this form of cellular core may be similar to that described with reference to Figure 1, but as an alternative it may, as shown, be built up of a number of separately insulated wires 12, in which case it may be desirable to apply a wrapping of rubber tape 113 to the circumferential surface of each rigid member 13 to avoid the risk of damage to the insulation of the wires at these places. This form of conductor is particularly suitable in cases where the cellular core consists of or includes expanded rubber which may be deleteriously affected by the high temperature to which the cable would be subjected during the process of vulcanising a rubber covering on the conductor. With a conductor built up of separately insulated wires or strands it may be desirable to apply a waterproof protective sheath to reduce friction during towing. Such a sheath is shown at 14 and may be of a known kind not requiring the application of heat to an extent that may result in damage to the expanded rubber of the core.

In Figure 3 yet another form of cellular core built up of inflated members is shown. In this form the resilient members are inflated spheres 15 of rubber or like material and the relatively rigid members, of which one is sandwiched between each two spheres, are deeply dished discs 16. These may be of wood, cellular rubber or cork, or they may be of some non-cellular but fairly light body, for instance, phenol formaldehyde resin. Over the cellular core 1 is disposed a conductor in the form of a tubular braid 17 which is insulated and protected by a tough rubber sheath 18. It will be appreciated, however, that in place of this braided conductor, a conductor of the form shown in Figure 1 or in Figure 2, or a conductor of any other suitable form may be used with this form of cellular core. Similarly a braided conductor may be combined with a cellular core of the form shown in Figure 1 or Figure 2.

The inflated cylinders or spheres described with reference to Figures 1, 2 and 3 may be produced in the same way as tennis balls. A hollow body is built up of a number of petals of sheet rubber or the like and before the body is closed up a quantity of a substance which on heating decomposes with evolution of gas is introduced. The closed hollow body is placed in an appropriately shaped mould and heated. The pressure generated by the gas liberated from the substance forces the walls of the hollow body into contact with the walls of the mould to form an inflated sphere or cylinder. The heating is continued until vulcanisation is complete.

Figure 4 shows an example of a cable rendered buoyant by a cellular core 1 comprising a series of cylinders 19 of resilient cellular material with intercalations of cylinders 20 of relatively rigid cellular material. The former are preferably of soft expanded rubber and the latter of hard expanded rubber, but, alternatively, the latter may well be of cork or wood. The cellular elements 19 of the core 1 and also the cellular elements 20 may be cut from expanded rubber sheet and provided with a skin 21 of tough rubber to strengthen them and better enable them to support the surrounding conductor 4, which is similar to that shown in Figure 1 and needs no further description.

Figure 5 shows a cable in which the conductor 22 is centrally disposed and insulated by a covering of rubber 22a and supported by buoyant elements of annular form threaded on the insulated conductor. These elements comprise resilient members 23 alternating with relatively rigid members 24; the former are shown to be short cylinders or discs of soft expanded rubber and the latter cylinders of hard expanded rubber. The elements of the cellular core are enclosed in a waterproof protective covering 25 of tough rubber or the like. It will be apparent that the buoyant annular core may be built up of inflated spheres or cylinders and of rigid cylinders of the type described with reference to Figures 1-3 inclusive, provided they are formed with a central passage for the insulated conductor on which they are to be threaded.

A further form of cellular core is shown in Figure 6. It is built up of rigid hollow drums 26 of moulded material, for instance, hard rubber or phenol formaldehyde resin, or of metal, separated by resilient discs 27, for instance, discs of soft cellular rubber. The core is shown carrying a conductor 4 of the form shown in Figure 1, but this type of cellular core construction is also applicable to cables embodying a central conductor, as will be clear from Figure 7 which shows a hollow conductor built up in a known manner of a single layer of wires 28 stranded about a support 29 consisting of an open helix of a strip of suitable cross-section, for instance, of channel, arcuate or circular cross-section, of metal or of hard non-metallic material such as hard rubber or synthetic plastic. The conductor is insulated by a covering 30 of suitable insulating material and on the insulated conductor are threaded alternately hollow drums 31 of annular form and annular discs 32 of resilient material.

In each of the examples of buoyant cable so far described the cellular core 1 is built up of a plurality of separate members, some or all of which are of cellular form and some of which are resilient and others of which are relatively rigid, placed end to end. In the manufacture of such cable it is in most cases advantageous to connect the individual units together. This may be done in several ways, for instance, by uniting the central parts of the adjacent end faces of successive members by adhesive. Where the members are of rubber or alternately of rubber and wood, a coumarone resin-rubber adhesive is suitable. It may be advantageous so to build up the core first in lengths of several feet and subsequently to join these lengths into long lengths. Alternatively, or additionally, the members may be connected together by a plurality of adhesive tapes 33 extending longitudinally of the core as shown in Figure 3 or by covering them with a light open braid 34 of cotton or other suitable material as shown in Figure 2. In cases where the cable conductor is built up on the cellular core, the units of the core may be fed into the hollow conductor during the assembly of the component wires. Where the units of the core are of annular form the core may be assembled by threading them on a cord or wire, or where the cable has a central conductor by threading them on the insulated conductor.

The core may, however, in certain cases be manufactured as an elongated cavitied member 35. A core of this form is shown in Figure 8 and comprises a plurality of large cells 36 having resilient rubber walls 37 separated by hard rubber discs 38 which are vulcanised to the end walls of the cells. Such a member may be made by alternately inserting in a tubular mould, first a disc of an unvulcanised or partially vulcanised hard rubber composition, then a hollow body of an unvulcanised soft rubber composition containing a quantity of a substance which on heating decomposes with evolution of gas, then a disc of hard rubber composition, and so on. The composite body is then heated within the mould until vulcanisation is complete. Instead of employing a single cavitied body 35 of this kind to form the core, the core may be built up of a number of such bodies bunched or laid up helically together about the cable axis, or, as shown in Figure 9, disposed about a central conductor which may be a solid strand or, as shown, a hollow conductor 40 formed by stranding the component wires about a cavitied member 41 similar to the members 35. The subject-matter disclosed in Figures 4 and 6 is claimed specifically in our copending application, Serial No. 713,319, filed November 30, 1946, as a division of this application and the subject-matter disclosed in Figures 5, 7 and 8 is claimed specifically in our copending application, Serial No. 713,320, also filed November 30, 1946, as a division of this application.

What we claim as our invention is:

1. In water-buoyant insulated electric power cable, a buoyancy element consisting of a flexible cellular core comprising a series of resilient members with intercalations of relatively rigid members.

2. In water-buoyant insulated electric power cable, a buoyancy element consisting of a flexible cellular core comprising a series of inflated bodies of flexible material with intercalations of bodies of relatively rigid material.

3. In water-buoyant insulated electric power cable, a buoyancy element consisting of a flexible cellular core comprising a series of inflated bodies of flexible material with intercalations of cylinders of relatively rigid material.

4. In water-buoyant insulated electric power cable, a buoyancy element consisting of a flexible cellular core comprising a series of inflated bodies of flexible material and a plurality of buoyant cylinders of relatively rigid material intercalated in said series of inflated bodies.

5. In water-buoyant insulated electric power cable, a buoyancy element consisting of a flexible cellular core comprising a series of inflated bodies of flexible material and a plurality of cylinders of relatively rigid cellular material intercalated in said series of inflated bodies.

6. In water-buoyant insulated electric power cable, a buoyancy element consisting of a flexible cellular core comprising a series of inflated rubber bodies and a plurality of wooden cylinders intercalated in said series of inflated bodies.

7. In water-buoyant insulated electric power cable, a buoyancy element consisting of a flexible cellular core comprising a series of groups of inflated rubber bodies and a plurality of relatively rigid members, each group of inflated bodies consisting of a body inflated at high pressure sandwiched between two bodies inflated at a lower pressure and adjacent groups being separated by at least one of said relatively rigid members.

8. In water-buoyant insulated electric power cable, a buoyancy element consisting of a flexible cellular core comprising low pressure inflated rubber cylinders and wooden cylinders, each two adjacent inflated cylinders being separated by a wooden cylinder.

9. In water-buoyant insulated electric power cable having a buoyancy element consisting of a flexible cellular core comprising a series of resilient members with intercalations of relatively rigid members, a plurality of adhesive tapes extending longitudinally of the core and connecting the core members together.

10. In water-buoyant insulated electric power cable, a buoyancy element consisting of a flexible cellular core comprising a series of resilient members, relatively rigid members intercalated in said series of resilient members, and an open tubular braid enclosing said resilient and said relatively rigid members.

11. In water-buoyant insulated electric power cable, a buoyancy element in the form of an elongated cellular member built up of a series of resilient members with relatively rigid members intercalated in said series of resilient members.

12. In water-buoyant insulated electric power cable having a conductor comprising a plurality of wires laid helically about a core comprising a plurality of short buoyancy elements of resilient material, the inclusion in said core of a plurality of relatively rigid members distributed along the length thereof, whereby to increase the resistance of said cable to crushing.

13. In water-buoyant insulated electric power cable, a buoyancy element consisting of a flexible core comprising a series of resilient members with intercalations of relatively rigid members of substantially the same overall diameter as said resilient members.

14. In water-buoyant insulated electric power cable, a buoyancy element consisting of a substantially cylindrical core built up of a series of resilient members and of relatively rigid members intercalated in said series.

15. In water-buoyant insulated electric power cable, a buoyancy element in the form of an elongated member built up of hollow cylinders and solid cylinders, the cylinders of one type being of flexible material and the cylinders of the other type being of relatively rigid material.

16. In water-buoyant insulated electric power cable, at least one buoyancy element in the form of an elongated cavitied member consisting of inflated cells with flexible walls separated from one another by cylinders of relatively rigid material.

17. In water-buoyant insulated electric power cable, at least one buoyancy element in the form of an elongated cavitied member consisting of inflated cells with flexible walls of an cylinders of relatively rigid material, the end faces of adjacent components parts of the member being united by adhesive.

18. In water-buoyant insulated electric power cable, a buoyancy element consisting of a flexible cellular core comprising a series of inflated rubber bodies, a plurality of relatively rigid members intercalated in said series of inflated bodies, and means comprising a number of adhesive tapes extending longitudinally of the core for connecting together said inflated rubber bodies and said rigid members.

19. In water-buoyant insulated electric power cable, a buoyancy element consisting of a flexible cellular core comprising low pressure inflated rubber bodies and wooden cylinders arranged alternately and means consisting of a number of adhesive tapes extending longitudinally of the core for connecting said cylinders together.

20. In water-buoyant insulated electric power cable, a buoyancy element consisting of a flexible cellular core comprising a series of resilient members with intercalations of relatively rigid members, the adjacent end faces of the individual core members being united together by adhesive.

21. A water-buoyant insulated electric power cable, having a flexible cellular core comprising a series of cylinders of resilient material and a plurality of cylinders of relatively rigid material intercalated in said series of cylinders of resilient material, and a conductor of hollow form enclosing said core comprising a plurality of component wires wound helically around said core.

22. In water-buoyant insulated electric power cable, a buoyancy element in the form of an elongated member built up of a series of resilient spherical members and of relatively rigid members intercalated in said series.

23. In water-buoyant insulated electric power cable, a buoyancy element in the form of an elongated member built up of a series of inflated spheres of resilient material and of relatively rigid members intercalated in said series.

24. In water-buoyant insulated electric power cable, a buoyancy element in the form of an elongated member built up of a series of resilient members and of cylinders of relatively rigid material, having dished end faces, intercalated in said series.

25. In water-buoyant insulated electric power cable, a buoyancy element in the form of an elongated member consisting of inflated balls with flexible walls separated from one another by deeply dished discs of water-buoyant, relatively rigid material.

PERCY DUNSHEATH.
WILLIAM CYRIL BARRY.

REFERENCES CITED

The following references are of record in the file of this patent:

UNITED STATES PATENTS

| Number | Name | Date |
| --- | --- | --- |
| 2,048,811 | Peirce | July 28, 1936 |

FOREIGN PATENTS

| Number | Country | Date |
| --- | --- | --- |
| 605,694 | Germany | Nov. 16, 1934 |